United States Patent [19]

Groppelli et al.

[11] 3,787,331
[45] Jan. 22, 1974

[54] CATALYST BASED ON ALUMINUM FLUORIDE FOR THE FLUORINATION IN GASEOUS PHASE OF HYDROCARBONS

[75] Inventors: Giovanni Groppelli; Vittorio Fattore; Martino Vecchio, all of Milan; Arsenio Castellan, Bollate, all of Italy

[73] Assignee: Montecatini Edison S.p.A., Milan, Italy

[22] Filed: Oct. 7, 1969

[21] Appl. No.: 864,519

[30] Foreign Application Priority Data
Oct. 10, 1968   Italy .................................. 22295/68

[52] U.S. Cl. .............................. 252/442, 260/653.7
[51] Int. Cl. .............................................. B01j 11/78
[58] Field of Search .................... 252/442; 260/653.7

[56] References Cited
UNITED STATES PATENTS
2,744,148   5/1956   Ruh et al. ........................ 252/442 X
3,294,852   12/1966   Vecchio et al. .................. 260/653.7
3,342,881   9/1967   Sasakura et al. .................. 260/653.7

Primary Examiner—Patrick P. Garvin
Attorney, Agent, or Firm—Stevens, Davis, Miller & Mosher

[57] ABSTRACT

A catalyst is disclosed for the preparation of fluroinated or chlorofluorinated hydrocarbons through fluorination or chlorofluorination reactions in gaseous phase, the catalyst comprising aluminum fluoride or fluorinated alumina containing minor quantities of manganese, chromium and preferably also nickel compounds present in quantities corresponding to the following percentages by weight of metal based on the total: from 0.05 to 5% of Mn, from 0.1 to 5% of Cr, and up to 5% of Ni. The manganese, the chromium and (when present) the nickel are at least partially present in the form of halides, and in particular the fluorides, or as oxides or as oxy-halides.

1 Claim, No Drawings

CATALYST BASED ON ALUMINUM FLUORIDE FOR THE FLUORINATION IN GASEOUS PHASE OF HYDROCARBONS

The present invention concerns new catalysts for the fluorination in gaseous phase of halogenated hydrocarbons and for the chlorofluorination of ethylene. These new catalysts are characterized in that they favor the formation of greater quantities of symmetrical compounds or of compounds with a degree of symmetry relatively higher than that of compounds obtained by means of known catalysts. The expression "degree of symmetry" as employed herein refers to the distribution of the fluorine atoms and it is also understood that a compound not exactly symmetrical, such as $CF_2Cl-CFCl_2$, nevertheless has a degree of symmetry greater than its isomer $CF_3-CCl_3$.

It is well known that many metal compounds show catalystic activity in the fluorination with HF in gaseous phase of halogenated hydrocarbons. In particular, there may be cited as examples the British Patent No. 428,361 disclosing halides of Fe, Ni, Co, Mn, Cd, Zn, and Hg as well as many others, including some combinations thereof.

In French Patent No. 1,380,938, the catalytic activity of halides Al, Fe, Cr, Mn and Ni (and of many other metals) in the above-cited reaction is suggested.

What does not seem to be known, however, is the particular catalytic compositions which are the object of this invention, and which distinguish themselves from other known compositions, amongst others, by its above-mentioned selective catalytic effect.

The catalysts prepared according to the present invention consist of aluminum fluoride containing minor quantities of manganese and chromium compounds, and preferably also of nickel compounds, which have been uniformly distributed on the aluminum fluoride granules, for instance by treating the aluminum fluoride itself with salt solutions of the above-listed metals.

The quantities of manganese, chromium and nickel compounds introduced into the present catalytic compositions base on aluminum fluoride must be such as to fall within the following limits:

from 0.05% to 5% by weight, based on the total of manganese,
from 0.1% to 5% by weight, based on the total, of chromium,
up to 5% by weight, based on the total, of nickel.

Instead of aluminum fluoride, one may also use alumina for the preparation of the catalyst described herein, the alumina in a subsequent fluorination treatment of the catalytic composition with gaseous HF being substantially converted into the fluoride. By using alumina for the preparation of the catalyst one will have to use somewhat greater quantities of manganese, chromium, and nickel compounds, that is, quantities towards the higher percentages indicated above.

The manganese, the chromium and the nickel are introduced into the catalytic composition of the present invention based on aluminum fluoride preferably in the form of solutions of their salts or other compounds, such as for instance nitrates and chlorides, which are adsorbed by the aluminum fluoride or by the starting alumina. The composition thus obtained is then dried in an oven at about 150°C.

In the preparation of the catalyst one preferably uses manganese, chromium and nickel compounds in the form of their halides or other compounds, in particular nitrates, which after the activation and fluorination treatments of the catalytic composition are at least partially present in the form of halides, in particular fluorides, or of oxides or oxy-halides.

The catalyst composition based on aluminum fluoride or on fluorinated alumina, after having been treated or combined with the above said metal compounds, is then subjected to an activation treatment and subsequently to fluorination. The activation is carried out by heating the product in a current of air or nitrogen for a period of from 0.5 to 4 hours, at a temperature between 300° and 550°C.

For preparing the catalyst from alumina one requires relatively higher temperatures than in the case of aluminum fluoride. The fluorination is carried out by heating the activated product in a current of gaseous HF, suitably diluted with air or nitrogen or with another inert gas, at a temperature between 200° and 500°C.

The dilution of the HF has mainly the purpose of more easily controlling the reaction temperature as well as to avoid local overheating.

The catalyst thus obtained in fine granular form, is particularly suited for use in fluid bed reactors.

The preparation of the catalyst of the present invention will now be illustrated in greater detail in the following Examples 1 and 2. In the first example the preparation starts from alumina, while in the second example the preparation starts from aluminum fluoride.

The catalyst according to the present invention has proved particularly useful in the following reactions:

a. Fluorination in gaseous phase, with HF, of halogenated ethanes containing at least one chlorine atom, at a temperature between 330° and 500°C. in order to obtain fluorinated or chlorofluorinated ethanes in high yields in the form of compounds having a high degree of symmetry with respect to the fluorine atoms, and in particular, the fluorination of $CF_2Cl-CFCl_2$, obtaining high yields of the symmetrical $CF_2Cl-CF_2Cl$ product and a reduced isomerization of the starting material into $CF_3CCl_3$.

b. Chlorofluorination of ethylene in gaseous phase with a $Cl_2 + HF$ mixture in the presence of recycled halogenated hydrocarbons, at a temperature between 330° and 500°C. in order to obtain prevailingly $C_2F_4Cl_2$ and $C_2F_3Cl_3$ with high percentages of isomers having a high degree of symmetry, that is, $CF_2Cl-CF_2Cl$ and $CF_2Cl-CFCl_2$.

d. Disproportioning reaction of $CF_2Cl-CFCl_2$ in gaseous phase, at temperatures between 330° and 500°C. with the formation of large quantities of the symmetrical compound $CF_2Cl-CF_2Cl$ and of very small quantities of $CF_3-CCl_3$ isomer.

It must be borne in mind that above the indicated limit of 500°C. the selectivity of the catalyst in promoting the formation of symmetrical products decreases with increase in temperature.

The use of the catalyst according to the present invention in the above cited reactions is illustrated hereinafter in Examples 3 to 10, which, however, are not to be taken as limiting but rather as illustrative.

EXAMPLE 1

PREPARATION OF THE CATALYST STARTING FROM ALUMINA 351 g of a 50% solution of Mn(NO₃)₂ are mixed with 106.8 g of NiCl₂·6H₂O and 67.5 g of CrCl₃·6H₂O and with little water at room temperature. The solutuion thus obtained is diluted to a volume of 370 cc corresponding to the total volume of the pores of the alumina to be impregnated. This solution is then slowly poured onto 1,000 g of Ketjen grade A alumina[1] kept under slow continuous stirring both during impregnation as well as during a subsequent period of 2 hours. The solution is then left to rest for 4 hours and is then dried in an oven for 12 hours at 150°C.

[1] CHEMICAL AND PHYSICAL CHARACTERISTICS OF THE ALUMINA USED

Alumina Ketjen grade A: in spheroidal shape
surface area 280 m²/g
volume of pores 0.45 cc/g
apparent specific weight 0.92 g/cc
Mean composition:
$Al_2O_3$ 97.46
$Na_2O$ 0.06%
$SiO_2$ 1.80%
$SO_4$ 0.66%
Fe 0.015%

Loss of weight after calcination at 450°C. for 4 hours = 20%

The granulometric distribution of the starting alumina is determined by means of screens (sieves) of the Tyler series and was:

| Mesh: | 80 | 100 | 150 | 200 | 270 | 325 | above 325 |
|---|---|---|---|---|---|---|---|
| % | 0.61 | 3.67 | 17.59 | 18.71 | 20.22 | 16.24 | 22.92 |

The impregnated alumina is then poured into an Inconel reactor of 5 cm diameter in which the activation, with a fluidizing velocity of about 9 cm/sec., is carried out with air and is then followed up by the fluorination with hydrofluoric acid according to the following procedures:

Activation

The mass is heated in an air stream for 4 hours from 25°C to 500°C. It is kept at 500°C. for 30 minutes and is then cooled down, still in an air stream, from 500°C. to 200°C. in 2 hours.

Fluorination

The mass is heated in an air stream up to 250°C and is then introduced for 9 hours into a mixture of air and HF. The total quantity of HF amounts to 1,450 g. Thereafter the mass is heated up from 250° to 420°C., still in an air stream. At 420°C. the mass is further fluorinated for 4 ½ hours with a mixture of air and HF. The quantity of HF introduced into the reactor amounts to 600 g.

Finally, the mass is cooled down from 420° to 200°C. in an air stream only.

EXAMPLE 2

PREPARATION OF THE CATALYST STARTING FROM $AlF_3$

For this test the catalyst was prepared by pouring the solution of active elements onto aluminum fluoride having the following chemical and physical characteristics:

content in fluorine amounting to 64.2%
contains the following elements, determined by emission spectrograph:

| Be | Ca | Cr | Cu |
|---|---|---|---|
| 0.0014% | 0.032% | 0.005% | 0.00019% |
| Ga | Fe | | Mg |
| 0.0087% | 0.018% | | 0.0096% |
| Mn | Mo | | Ni |
| 0.0005% | 0.0048% | | 0.005% |
| Si | Na | | Pb |
| 0.060% | 0.021% | | 0.001% | upon X-ray analysis it turned out to consist of γ-$AlF_3$ with the presence of β-$AlF_3$.

It showed the following granulometric distribution, determined with screens of the Tyler series:

| Mesh: | 120 | 140 | 170 | 200 | Mesh: | 230 | 270 | 325 | above 325 |
|---|---|---|---|---|---|---|---|---|---|
| % | 5.2 | 14.9 | 13.4 | 16.2 | % | 18.8 | 12.8 | 12.8 | 5.8 |

On 500 g of this aluminum fluoride was poured under continuous slow stirring the solution of active elements. This solution of active elements was prepared by dissolving 42.6 g of NiCl₁·6H₁O, 26.9 g of CrCl₃·6H₂O and 68.5 g of a 50% solution Mn(NO₃)₂ in the minimum quantity of water heated at 80°C. and by diluting the resulting solution up to a volume of 80 cc which corresponded to the total volume of the pores of the aluminum fluoride to be impregnated. The whole was then left to rest for 4 hours and was then dried for 12 hours at 150°C.

The activation was carried out with air in an Inconel reactor with a diameter of 5 cm, at a fluidizing speed of about 9 cm/sec., and was then followed by the fluorination with hydrofluoric acid according to the following procedure:

Activation

The mass was heated up to 300°C. in a stream of $N_2$, then maintained at this temperature for 1 hour and, finally, cooled down from 300° to 200°C. in 30 minutes, still in a stream of $N_2$.

Fluorination

The mass was heated up to 420°C. in a stream of $N_2$ for a period of 90 minutes. Thereupon, and for a period of 90 minutes, a stream of $N_2$ + HF (total: 90 g of HF) at 420°C. was passed over the mass. Finally, it was cooled down from 420° to 200°C. in 60 minutes in a stream of nitrogen.

EXAMPLE 3

FLUORINATION IN GASEOUS PHASE OF $CF_2Cl—CFCl_2$

The fluorination reaction was carried out in a nickel reactor containing a catalyst based on aluminum fluoride with varying quantities of manganese, chromium, nickel, with an equimolar ratio of the HF and $CF_2Cl—CFCl_2$ reactants.

The reaction products were washed with water and caustic soda and were then condensed. The composition of the mixture was determined by chromatography and, with regard to the isomers, by means of I.R. absorption spectra.

Table 1 records the results, after 5 hours running, of the tests carried out both with the catalyst of the present invention as well as with different other catalysts, in order to demonstrate the characteristic results

EXAMPLE 4

CHLOROFLUORINATION OF ETHYLENE

Continuous tests on the chlorofluorination of ethylene in gaseous phase were conducted in the presence both of catalysts according to the present invention as well as in the presence of other different catalysts for purposes of comparison. The results after about 25 hours running are recorded in Table 2.

These tests were carried out in a nickel reactor containing the catalyst based on aluminum fluoride with varying quantities of manganese, nickel and chromium, feeding in the reactants $C_2H_4$, $Cl_2$, HF together with recycle products (i.e., chlorofluorinated hydrocarbons) whose composition is reported in Table 3.

The reaction product was subjected to distillation. The tail fraction was recycled back into the reactor, while the head fraction was composed of a mixture of $C_2F_5Cl$, $C_2F_4Cl_2$ and $C_2F_3Cl_3$. Both the composition and the ratio between the various isomers are recorded in Table 2.

EXAMPLE 5

DISPROPORTIONING REACTION AND IZOMERIZATION OF $CF_2Cl$—$CFCl_2$

The $CF_2Cl$—$CFCl_2$ in the gaseous state is passed through a glass reactor containing the catalyst according to the working conditions indicated in Table 4.

The reaction products, after 5 hours running, were directly conveyed into a chromatograph in order to determine their composition. The results recorded in Table 4 show how effective is the contemporaneous presence of manganese, chromium and nickel in the aluminum fluoride in favoring the disproportioning reaction of $CF_2Cl$—$CFCl_2$, thereby forming symmetrical products, and in reducing the isomerization reaction to yield the undesired $CCl_3$—$CF_3$.

EXAMPLE 6

Through a nickel reactor containing fluorinated alumina impregnated with 0.8% of Mn, 1% of Cr and 2% of Ni, there was passed a stream of $CF_2Cl$—$CFCl_2$ at a temperature of 450°C. After a run of about 100 hours the temperature was decreased to 400°C. and the composition of the gases flowing out of the reactor was determined. Table 5 records all the reaction conditions of this test as well as the products obtained.

EXAMPLES 7 and 8

Using the same catalyst as in the preceding example, two fluorination tests in gaseous phase were carried out on $CF_2Cl$—$CFCl_2$ in the same equipment used in Example 3. Table 5 records the reaction conditions and the products obtained in this test.

EXAMPLE 9

A continuous chlorofluorination test in gaseous phase on ethylene was conducted in the presence of a catalyst consisting of fluorinated alumina impregnated with manganese, chromium and nickel nitrates. The reaction was conducted in an Inconel reactor provided with a thermometer sheath of AISI 316, according to the same procedures as described above in Example 4. The test was carried on for about 210 hours at 400°C. and subsequently for another 300 hours at 450°C.

Table 6 records the conditions used and the products obtained at various times after start of the run. Table 7 records the corresponding composition of the recycle during the same run.

EXAMPLE 10

2.164 g of fluorinated alumina were impregnated with a solution consisting of 64 g of $MnCl_2 \cdot 4H_2O$ and 129.8 g of $CrO_3$, and were then dried in a fluid bed at 100°C. The mass was then kept for 12 hours in an oven at 150°C.

The impregnated fluorinated alumina was then loaded into a nickel reactor and was heated up to 300°C. in a stream of $N_2$ for 2 hours. Thereafter the temperature was increased to 450°C. and a mixture of air and HF (40% of HF) was fed in for 2 hours.

Thereupon the temperature was raised to 500°C. and for 14 hours there was passed through the reactor a stream of $CF_2Cl$—$CFCl_2$. After this period the temperature was reduced to 400°C. and the composition of the gases flowing out of the reactor was determined.

Table 8 records the reaction conditions and the products obtained from this run.

After a further treatment at 500°C. for further 26 hours, the conversion of the $CF_2Cl$—$CFCl_2$ at 400°C had not varied.

From the foregoing, it is quite evident how good the stability of the catalyst is even at 500°C.

The catalyst used at the above indicated temperatures appeared to be gray in color.

TABLE 1

| TEST No. | 1 | 2 | 3 | 4 | 5 | 6 |
|---|---|---|---|---|---|---|
| Catalyst | $AlF_3$ | $AlF_3$ | $AlF_3$ | $AlF_3$ | $AlF_3$ | $AlF_3$ |
| Ni % | 0 | 2 | 2 | 0 | 2 | 2 |
| Cr % | 0 | 0 | 1 | 0 | 1 | 1 |
| Mn % | 0 | 0 | 0 | 0.5 | 1 | 2 |
| Reaction temp. in °C. | 400 | 400 | 400 | 400 | 400 | 400 |
| Contact time, in seconds | 3 | 3 | 3 | 3 | 3 | 3 |
| Conversion of HF, % | 83 | 86 | 79 | 50.8 | 42 | 31 |
| Conv. of $CF_2Cl\ CFCl_2$, % | 96 | 94 | 83 | 55 | 50.5 | 31.8 |
| Net yields, % (+) | | | | | | |
| in $CF_3CF_2Cl$ | 16 | 31 | 18 | 5.5 | 3.4 | 0.1 |
| in $CF_3CFCl_2$ | 48 | 26 | 20 | 41 | 9.5 | 2 |
| in $CF_2Cl\ CF_2Cl$ | 8.5 | 16 | 46 | 39.5 | 77.5 | 88.5 |
| in $CF_3CCl_3$ | 23 | 16 | 7.7 | 6 | 1 | 0.1 |

(+) The difference between these totals and 100% is for the most part constituted by $C_2F_3Cl_4$ (mixture of isomers)

TABLE 2

| TEST No. | 1 | 2 | 3 |
|---|---|---|---|
| Catalyst: | | | |
| Ni % | 0 | 2 | 2 |
| Cr % | 0 | 0 | 1 |
| Mn % | 0 | 0 | 2 |
| Reaction temp. °C. | 400 | 400 | 400 |
| Contact time in sec. | 1.7 | 1.5 | 3 |
| $Cl_2/HF/C_2H_4$ | 6.1/4.6/1 | 5/4.4/1 | 5.3/5.3/1 |
| Recycle $/C_2H_4$ | 10/1 | 10/1 | 10/1 |
| Conversion of HF, % | 86.3 | 88 | 61.6 |
| Net yields, % | | | |
| in $C_2F_3Cl$ | 2.4 | 1.8 | traces |
| in $C_2F_4Cl_2$ | 80 | 74.1 | 19 |
| in $C_2F_3Cl_3$ | 16.4 | 23.9 | 81 |
| Selectivity: | | | |
| $CF_2Cl-CF_2Cl/C_2F_4Cl_2$, % | 11 | 24 | 77 |
| $CF_2Cl-CFCl_2/C_2F_3Cl_3$, % | 56 | 45 | 97 |

TABLE 3

| TEST No. | 1 | 2 | 3 |
|---|---|---|---|
| Composition in the recycle, in % by weight | | | |
| $C_2F_4Cl_2$ | 0.5 | 0.5 | traces |
| $CF_3-CCl_3$ | 11.4 | 17 | 1 |
| $CF_2Cl-CFCl_2$ | 13.4 | 14 | 31.3 |
| $C_2FCl_3$ | 0.7 | 1.4 | 0.7 |
| $C_2HCl_3$ | 1.5 | 0.8 | 1.6 |
| $C_2F_2Cl_4$ (*) | 22.4 | 23.6 | 27.4 |
| $C_2Cl_4$ | 43.5 | 31.2 | 30 |
| $C_2FCl_5$ | 5.4 | 7.5 | 6.9 |
| $C_2Cl_6$ | 1.3 | 3.3 | 1.2 |

(*) in test 3, the $C_2F_2Cl_4$ is made up of 75% of the symmetrical isomer.

TABLE 4

| TEST No. | 1 | 2 | 3 | 4 | 5 | 6 | 7 |
|---|---|---|---|---|---|---|---|
| Catalyst | | | | | | | |
| Ni % | — | 2 | — | — | 2 | 2 | — |
| Cr % | — | — | 2 | — | 1 | 1 | — |
| Mn % | — | — | — | 0.5 | 1 | 2 | 0.8 |
| Reaction temp., °C | 400 | 400 | 400 | 400 | 400 | 400 | 400 |
| Contact time (sec) | 3 | 3 | 3 | 3 | 3 | 3 | 1.5 |
| Conversion | 99% | 97% | 99% | 91% | 67% | 37% | 31.5% |
| Net yield | | | | | | | |
| in $C_2F_3Cl$ | 4.6% | 14.8% | 12.7% | 4% | 3.6% | 3.2% | 0.6% |
| in $C_2F_4Cl_2$ (*) | 23.7% | 13.9% | 17% | 31% | 41% | 45% | 37.4% |
| in $CF_3CCl_3$ | 32.9% | 27.9% | 28% | 21% | 7% | 0.1% | 14.5% |
| in $C_2F_2Cl_4$ | 32.8% | 43.9% | 42.3% | 39% | 49% | 51% | 43.5% |

(*) In tests 5 and 6, the $C_2F_4Cl_2$ consists prevailingly of the $CF_2Cl\ CF_2Cl$ isomer.
In test 7, the $C_2F_4Cl_2$ consists to the extent of 33% of the $CF_2Cl\ CF_2Cl$ isomer.

TABLE 5

| EXAMPLE | 6 | 7 | 8 |
|---|---|---|---|
| | disproportioning | fluorination | fluorination |
| Catalyst | | | |
| Ni % | 2 | 2 | 2 |
| Cr % | 1 | 1 | 1 |
| Mn % | 0.8 | 0.8 | 0.8 |
| Reaction temp., °C. | 400 | 450 | 400 |
| Contact time, sec. | 3 | 3 | 3 |
| $HF/C_2F_3Cl_3$ | — | 1 | 1 |
| Conversion of HF | — | 35 | 24.2 |
| Conversion of $CF_2ClCFCl_2$ | 41.5 | 37.4 | 24.8 |
| Net yield, | | | |
| in $CF_3CF_2Cl$ | 0.6% | 0.8% | 0.2% |
| in $CF_2CFCl_2$ | 16.3% | 5.4% | 3.2% |
| in $CF_2Cl\ CF_2Cl$ | 30.5% | 85% | 89% |
| in $CF_3CCl_3$ | 9% | traces % | traces % |
| in $C_2F_2Cl_4$ | 40.2% | 8.4% | 7.2% |

TABLE 6

| Hours after start | 110 | 210 | 251 | 466 |
|---|---|---|---|---|
| Catalyst | | | | |
| Ni | 2 | 2 | 2 | 2 |
| Cr | 1 | 1 | 1 | 1 |
| Mn | 0.8 | 0.8 | 0.8 | 0.8 |
| Reaction temp. °C | 400 | 400 | 450 | 450 |
| Contact time, sec. | 3 | 3 | 3 | 3 |
| $Cl_2/HF/C_2H_4$ | 5.2/4.9/1 | 5.2/7/1 | 5.3/5.2/1 | 5.3/4.95/1 |
| Recycle/$C_2H_4$ | 10/1 | 10/1 | 10/1 | 10/1 |
| Conversion of HF | 63 | 43 | 66 | 64 |
| Net yield in: | | | | |
| $C_2F_5Cl$ | 0.1% | 0.2% | 0.2% | 0.1% |
| $C_2F_4Cl_2$ | 3.1% | 5% | 33.5% | 20.8% |
| $C_2F_3Cl_3$ | 96.4% | 94.7% | 65.5% | 78.4% |
| Selectivity: | | | | |
| $CF_2Cl\ CF_2Cl/C_2F_4Cl_2$, 100 | 82 | 83 | 58 | 63 |
| $CF_2Cl\text{-}CFCl_2/C_2F_3Cl_3$, 100 | 99.15 | 99.4 | 95.7 | 95.3 |

TABLE 7

| Hours after start | 110 | 210 | 251 | 466 |
|---|---|---|---|---|
| Recycle composition % by weight | | | | |
| $C_2F_4Cl_2$ | 0.1 | 0.1 | 0.2 | 0.1 |
| $CF_3CCl_3$ | 0.4 | 0.4 | 2.3 | 2.1 |
| $CF_2Cl\ CFCl_2$ | 55.8 | 55.6 | 51.7 | 43.5 |
| $C_2FCl_3$ | traces | traces | 0.5 | 1.0 |
| $C_2HCl_3$ | traces | traces | traces | traces |
| $C_2F_2Cl_4$ | 32.4 | 35.0 | 28.5 | 29.2(*) |
| $C_2Cl_4$ | 2.2 | 2.4 | 10.6 | 16.4 |
| $C_2FCl_5$ | 6.7 | 5.9 | 5.2 | 5.4 |
| $C_2Cl_6$ | 0.4 | 0.6 | 1.0 | 2.3 |

(*) The $C_2F_2Cl_4$ consists to the extent of 72.4% of the symmetrical isomer.

TABLE 8

Disproportioning reaction of $CF_2Cl\text{—}CFCl_2$

| | |
|---|---|
| Reaction temperature: | 400°C |
| Contact time: | 1.5 seconds |
| Conversion of $CF_2Cl\text{-}CFCl_2$: | 21.3% |
| Net yield % in: | |
| $CF_3CF_2Cl$ | traces |
| $CF_3CFCl_2$ | 9.3% |
| $CF_2Cl\text{-}CF_2Cl$ | 33.8% |
| $CF_3\text{-}CCl_3$ | 3.9% |
| $C_2F_2Cl_4$ | 53.0% |

What is claimed is:

1. A catalyst for the preparation of fluorinated hydrocarbons by fluorination or chlorofluorination reactions in gaseous phase, consisting essentially of aluminum fluoride containing manganese, chromium and preferably also nickel, essentially in the form of halides, oxides or oxy-halides, wherein the quantities of those metallic compounds correspond to the following percentages by weight of metal based on the total: from 0.05% to 5% of Mn, from 0.1% to 5% of Cr, and up to 5% of Ni.

* * * * *